(12) United States Patent
Clougherty et al.

(10) Patent No.: US 7,715,937 B2
(45) Date of Patent: *May 11, 2010

(54) ALLOCATING MANUFACTURED DEVICES ACCORDING TO CUSTOMER SPECIFICATIONS

(75) Inventors: Frances S. Clougherty, South Burlington, VT (US); Benjamin R. Bayat, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 215 days.

This patent is subject to a terminal disclaimer.

(21) Appl. No.: 11/548,388

(22) Filed: Oct. 11, 2006

(65) Prior Publication Data

US 2007/0129835 A1    Jun. 7, 2007

Related U.S. Application Data

(63) Continuation of application No. 10/908,135, filed on Apr. 28, 2005, now Pat. No. 7,139,630.

(51) Int. Cl.
*G06F 19/00* (2006.01)
(52) U.S. Cl. .......................... 700/108; 700/121; 438/14
(58) Field of Classification Search .................. 700/99, 700/101, 108–110, 121; 702/1, 4, 81–84, 702/182–185; 438/14–17
See application file for complete search history.

(56) References Cited

U.S. PATENT DOCUMENTS

| 4,379,259 | A | * | 4/1983 | Varadi et al. .................. 714/45 |
|---|---|---|---|---|
| 5,805,472 | A | | 9/1998 | Fukasawa |
| 5,946,214 | A | | 8/1999 | Heavlin et al. |
| 6,028,994 | A | | 2/2000 | Peng et al. |
| 6,229,329 | B1 | | 5/2001 | Nakata |
| 6,274,395 | B1 | | 8/2001 | Weber |
| 6,311,096 | B1 | | 10/2001 | Saxena et al. |
| 6,400,575 | B1 | | 6/2002 | Brown et al. |
| 6,560,568 | B1 | | 5/2003 | Singhal et al. |
| 6,699,727 | B1 | | 3/2004 | Toprac et al. |
| 6,753,253 | B1 | | 6/2004 | Takahashi et al. |
| 6,764,869 | B2 | | 7/2004 | Eldridge |
| 6,789,032 | B2 | | 9/2004 | Barbour et al. |
| 6,795,800 | B1 | | 9/2004 | Lee |
| 6,815,712 | B1 | | 11/2004 | Kline |
| 6,832,205 | B1 | | 12/2004 | Aragones et al. |
| 7,388,393 | B2 | * | 6/2008 | Yamamoto ................... 324/765 |
| 2003/0049873 | A1 | | 3/2003 | Eldridge |
| 2003/0069706 | A1 | * | 4/2003 | Madge ........................ 702/81 |
| 2003/0129775 | A1 | | 7/2003 | Kline |
| 2004/0153331 | A1 | * | 8/2004 | Zhang et al. ................... 705/1 |
| 2005/0153465 | A1 | * | 7/2005 | Wada et al. ................... 438/14 |

FOREIGN PATENT DOCUMENTS

EP    0071880    2/1983
WO    WO 2004/061634    7/2004

* cited by examiner

*Primary Examiner*—Charles R Kasenge
(74) *Attorney, Agent, or Firm*—Gibb I.P. Law Firm, LLC

(57) ABSTRACT

A method and system sorts manufactured integrated circuit devices by evaluating performance characteristics of the manufactured integrated circuit devices. All of the integrated circuit devices are manufactured using an identical design, and differences in the performance characteristics among the integrated circuit devices occurs because of variations including manufacturing line variations. The integrated circuit devices are sorted into groups according to the performance characteristics and are utilized in different computing devices depending upon individual performance requirements of the computing devices.

20 Claims, 4 Drawing Sheets

ALLOCATING MANUFACTURED DEVICES ACCORDING TO CUSTOMER SPECIFICATIONS

CROSS-REFERENCE TO RELATED APPLICATIONS

This application is a continuation of U.S. application Ser. No. 10/908,135 filed Apr. 28, 2005 now U.S. Pat. No. 7,139,630.

BACKGROUND OF THE INVENTION

1. Field of the Invention

The invention relates to a method of sorting identically manufactured devices according to the different performance characteristics of the manufactured devices into groups using customer specifications.

2. Description of the Related Art

The ability to manufacture large quantities of devices simultaneously improves manufacturing efficiency, thereby lowering the cost per unit of item produced. When manufacturing integrated circuit devices, it is often possible to manufacture large numbers of integrated circuit chips on a single wafer. While all the chips on a wafer may be manufactured from the same design, various processing differences can cause the devices to operate differently. These manufacturing differences can depend upon the position of the chip on the wafer and can vary between different wafers that are processed at different times (different batches) or are processed in different manufacturing lines. Therefore, even though a single design is utilized to manufacture multiple integrated circuit devices, these devices can have somewhat different performance characteristics. Conventionally, these devices were determined to be defective or nondefective depending upon how greatly the difference in performance characteristics deviated from what was expected from the single design used to make the devices.

In addition, conventional systems generally use a unique design for each different set of customer requirements. Therefore, integrated circuit devices that are to be used in one type of device will have one design and integrated circuit devices that are used in a different type of device that has different operating characteristics will use a different design. Thus, the conventional systems require a separate design for each different set of operating characteristics. The process of designing, testing, setting up manufacturing systems, etc. for each different design is expensive and time-consuming.

SUMMARY OF THE INVENTION

In its most general form, the invention provides a method and service of sorting identically manufactured devices, such as identically designed integrated circuit chips simultaneously formed on a single wafer, into groups. The invention begins with customer specifications including operating frequency, power consumption, supply voltage, voltage tolerance, operating temperature, guardband, etc. Then, the invention evaluates the performance characteristics of manufactured (non-defective) integrated circuit devices. For example, the invention can evaluate the integrated circuit devices at different voltages and at different temperatures. All of the integrated circuit devices are manufactured using an identical design; however, differences in the performance characteristics among the integrated circuit devices occurs because of unintended processing variations including manufacturing line variations.

The invention sorts the integrated circuit devices into groups according to their performance characteristics. Customer specifications allow for the establishment of power and frequency cutoffs, again using previously acquired empirical data, which are used in the sorting process. The empirical data that is used to establish the power and frequency is determined by testing an initial group of the integrated circuit devices under different conditions. Further, the empirical data can be presented as a graph of, for example, power versus current and a graph of frequency versus delay so that it can be extrapolated to non-tested values.

This sorting process is performed in a predetermined order that biases more integrated circuit devices into selected groups and less integrated circuit devices into other groups. The predetermined order is based on customer supply and demand data for the computing devices in which the integrated circuit devices will be utilized. Once the integrated circuit devices are sorted, the different groups of integrated circuit devices are utilized in different computing devices depending upon individual performance requirements of the computing devices. The collection on the empirical data also allows for a representative distribution of an expected yield for each of the different groups of the integrated circuit devices to be prepared.

The different computing devices are based on different designs having different power and frequency requirements. The computing devices can supply different voltages to the integrated circuit devices and can require the integrated circuit devices to operate in different environments (e.g. temperatures, etc.).

A system embodiment of the invention includes a means for evaluating performance characteristics, such as a tester. In addition, the system includes means for sorting, such as a sorter, adapted to sort the integrated circuit devices into groups according to the performance characteristics. The system also includes means for utilizing the different groups of integrated circuit devices in a form of a director that is adapted to direct different groups of the integrated circuit devices in different computing devices depending upon individual performance requirements of the computing devices. Within the system, the tester evaluates the integrated circuit devices at different voltages and at different temperatures. Further, the tester is adapted to remove defective integrated circuit devices so that only non-defective devices are included within the analysis.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The invention will be better understood from the following detailed description with reference to the drawings, in which.

DETAILED DESCRIPTION OF EMBODIMENTS OF THE INVENTION

Figure 1:
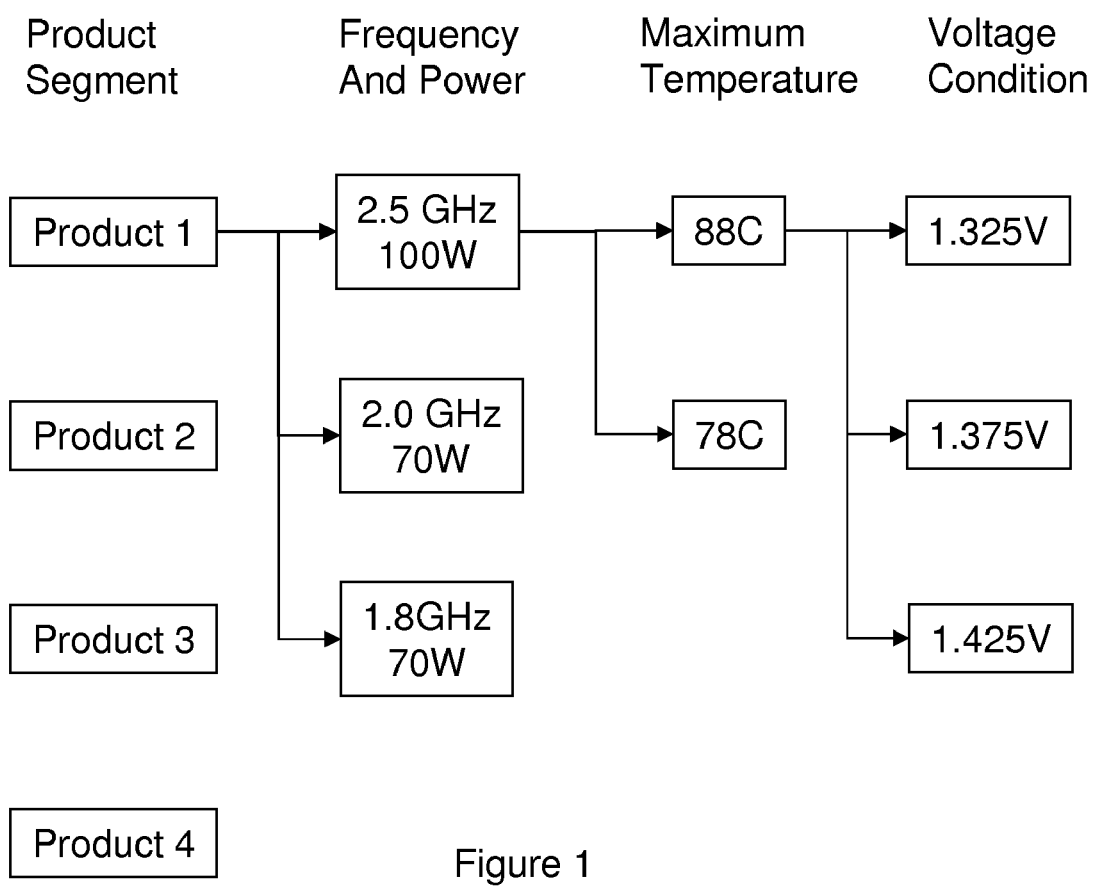
FIG. 1 is a schematic diagram illustrating the specifications for different product segments.

The present invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention. The examples used herein are intended merely to facilitate an understanding of ways in which the invention may be practiced and to further enable those of skill in the art to practice the invention. Accordingly, the examples should not be construed as limiting the scope of the invention.

As mentioned above, identically designed and identically manufactured integrated circuit devices (such as integrated circuit chips, memory arrays, circuit boards, and other similar devices manufactured using integrated circuit methodologies) can have different operating characteristics because of variations between processing batches and variations between processing lines. Rather than just determining whether such identically designed integrated circuit devices are defective or not defective, the invention sorts the integrated circuit devices according to their operating characteristics. Then, the invention can utilize the integrated circuit devices in different computing devices (such as personal computers, mainframe computers, portable digital assistants (PDAs), cell phones, automobiles, appliances, calculators, video games, and any other devices that can utilize and integrated circuit-type device) depending upon the operating characteristic requirements of the different computing devices. This allows more of the integrated circuit devices to be utilized and also allows a single design to be utilized for many different computing devices (rather than utilizing a different design for each different computing device) which reduces the time and expense associated with creating, testing and manufacturing different designs.

Further, the invention decides which cut points will be used within the sorting process depending upon the known or anticipated operating requirements of the different computing devices. In other words, if one or more type of computing devices is known to have minimum and maximum power (voltage), speed (frequency), temperature requirements, etc., these minimums and maximums are used as cut points in the sorting process. The sorting process can utilize many different cut points for the different classifications into which the integrated circuit devices are sorted. When defining the categories in this manner, various integrated circuit devices may easily fit within multiple categories (or even all categories).

Thus, the invention also establishes a sort order priority which causes certain classifications to be filled before other classifications are filled. This allows the higher value (or higher priority) computing devices to be supplied integrated circuit devices before lower value (or lower priority) devices are supplied. Further, the sort order priority more evenly distributes integrated circuit devices which may qualify for many different classes within the sort. In other words, by determining the expected distribution of different operating characteristics of the integrated circuit devices (based on empirical test results) the invention determines which categories will be difficult to fill and which categories will be easy to fill. The sort order will first sort to supply the more difficult categories and then supply the more easily filled categories after the more difficult categories are filled. Thus, the invention more efficiently utilizes the distribution of the integrated circuit devices that are produced, which reduces waste and increases yield.

Thus, the invention provides a method of sorting identically manufactured devices, such as identically designed integrated circuit chips simultaneously formed on a single wafer, into groups. The invention begins with operating requirements that the integrated circuit devices need to satisfy in order to work properly with the computing device into which the integrated circuit devices will be utilized. These operating requirements can include operating frequency, power consumption, supply voltage, voltage tolerance, operating temperature, guardband, etc. of the computing devices. A guardband, internal to the supplying company, may be applied against a specification (frequency, power . . . ) to increase the reliability such that parts delivered with a guardband are likely to perform well within the customers' specifications for the time period expected. The value of the guardband is dependent upon, but not limited to, the segment specifications, expected end of life of the computing device and the semiconductor technology in which the integrated circuit device is manufactured. The operating requirements are sometimes referred to as "segment specifications" or "customer specifications" because integrated circuit chip manufacturers often sell to "segments" or "customers" who manufacture the computing devices.

For example, as shown in FIG. 1, four product segments (products 1-4) are illustrated. Each product segment (computing device) can have multiple operating requirements or specifications, depending upon the version, generation, or model of the computing device. The exemplary operating requirements evaluated in FIG. 1 are frequency and power; maximum temperature; and voltage condition; however, as would be understood by one ordinarily skilled in the art, many other requirements could be evaluated and the requirements shown in FIG. 1 are only examples.

In the example shown in FIG. 1, different versions/applications of the computing device identified as product 1 can operate at three different frequencies and powers (1.8-2.5 GHz and 70-100 W). Each of the other products similarly operate at multiple frequencies and powers. Further, the version of product 1 that operates at 2.5 GHz and 100 W can operate in different modes producing different temperatures and voltage conditions. As would be understood by one ordinarily skilled in the art, the other versions of product 1 can similarly operate within different modes, although these modes are not shown specifically in the drawings. For example, one mode will produce a temperature of 88° C. and another mode will produce a temperature of 78° C. Within the mode that operates at 88° C., three voltage conditions can exist ranging from 1.325V to 1.425V. Each of the other frequency and power operating conditions will similarly produce multiple temperature and voltage conditions.

Figure 2:
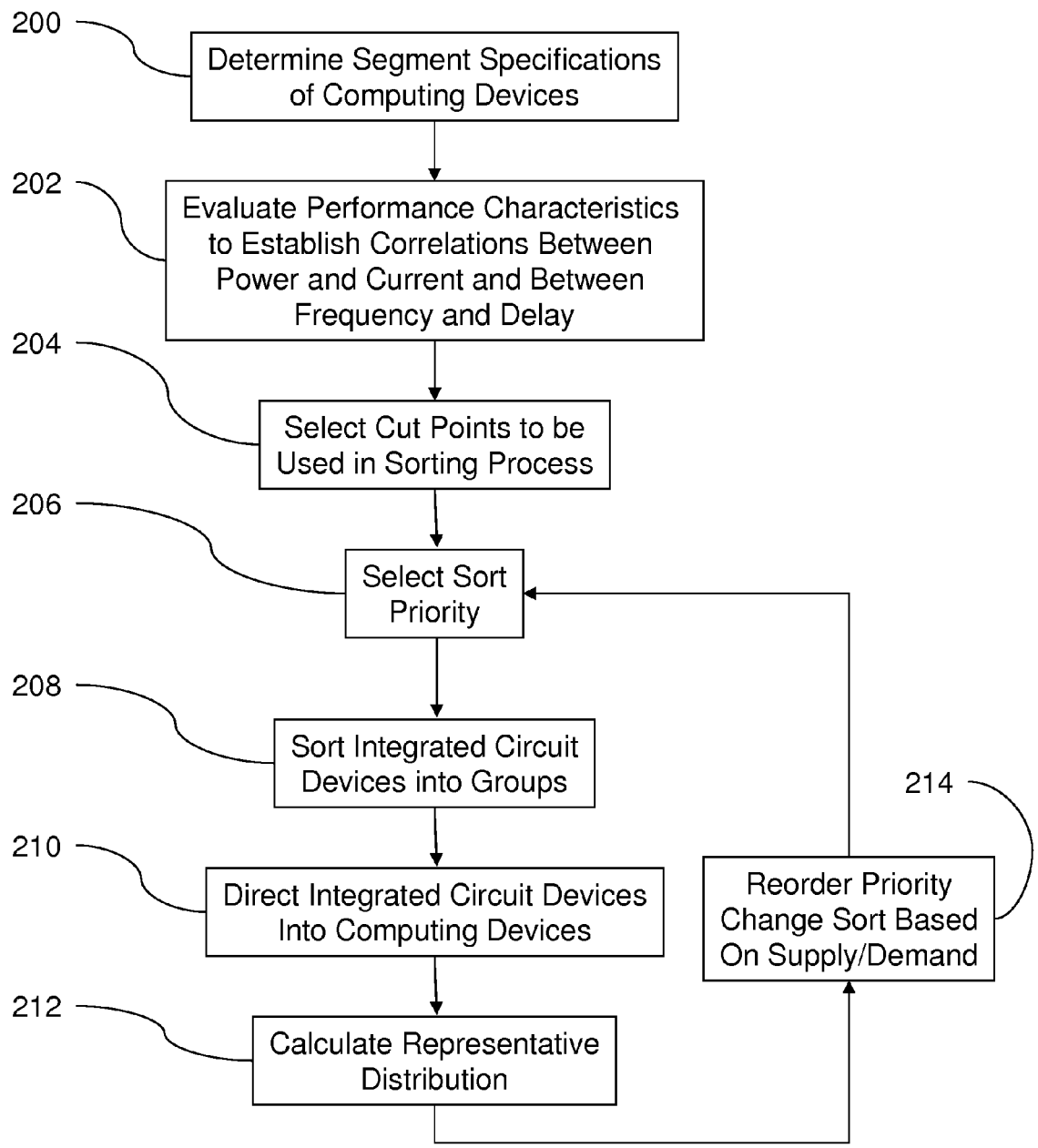
FIG. 2 is a flow diagram illustrating method and service embodiments of the invention.

As shown in flowchart form in FIG. 2, the inventive method and service begins with such product segment information. Therefore, item 200 illustrates that the invention determines the segment specifications of the different computing devices that can potentially utilize the integrated circuit device being evaluated through the method.

Then, as shown in item 202, the invention evaluates the performance characteristics of manufactured (non-defective) integrated circuit devices to establish an initial representative distribution of the approximate percentage of different operating characteristics that can be expected from an average production run of the integrated circuit devices. For example, this empirical testing may indicate that 25 percent of the integrated circuit devices will operate at 2.5 GHz; 25 percent will operate at 2.2 GHz; that 45 percent will operate at 1.9 GHz; and that 5 percent will be defective (outside any acceptable operating speed range). Once again, these are identically manufactured and designed chips that have different operating speeds because of potentially unintended and uncontrollable variations that arise between different processing batches and different processing lines.

In item 202, the invention calculates correlations between various operating characteristics of the integrated circuit devices and operating environments within the computing devices, such as (in this example) power and current; and frequency and delay. For example, in item 202 the invention can use the previously gathered empirical testing data from the integrated circuit devices to correlate how the integrated circuit devices will perform at different voltages and at different temperatures.

Figure 3:
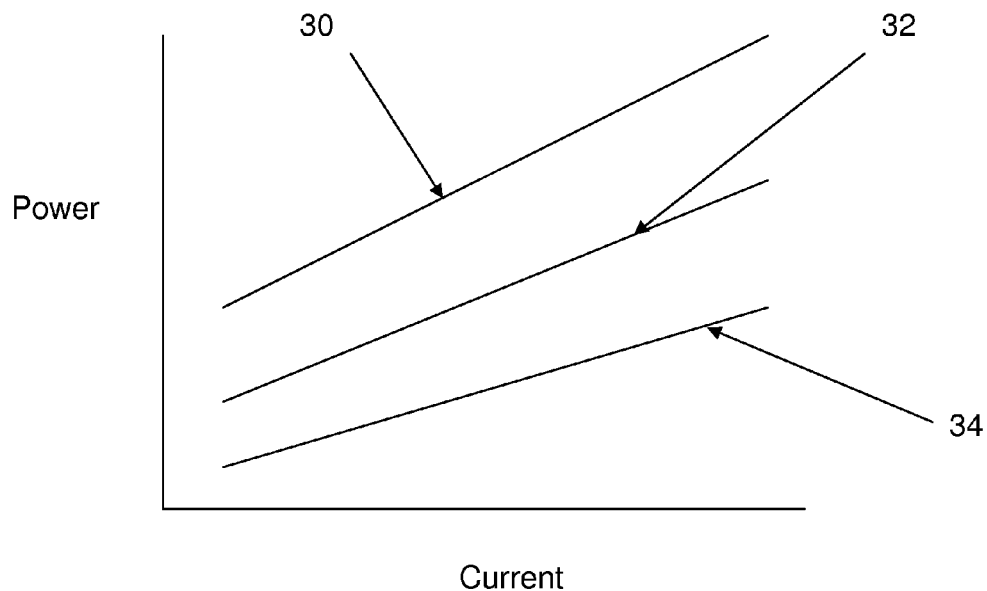
FIG. 3 is a graph showing the relationship between power and current.
Figure 4:
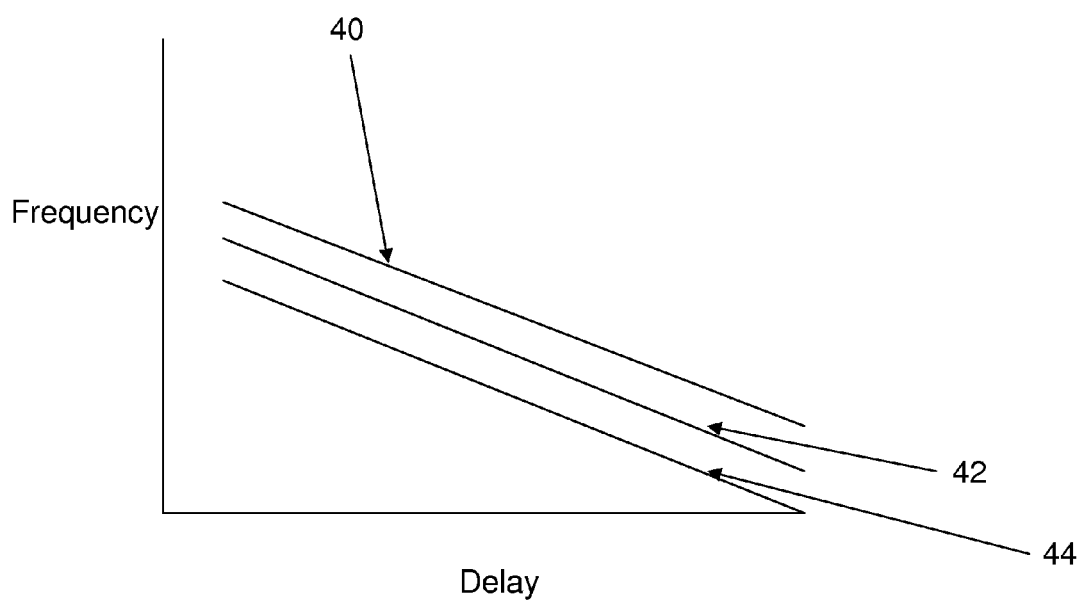
FIG. 4 is a graph showing the relationship between frequency and delay.

In item 202, the empirically established values are determined by testing an initial group of the integrated circuit devices under different temperature and voltage conditions. Further, the empirical data can be presented as a graph of power versus current (as shown in FIG. 3) and a graph of frequency versus delay (as shown in FIG. 4) so that it can be extrapolated to non-tested values. In the example shown in FIG. 3, curve 30 represents the 1.425 voltage example shown in FIG. 1. Curve 32 represents the 1.375 voltage example shown in FIG. 1 and curve 34 represents the 1.325 voltage example shown in FIG. 1. In the example shown in FIG. 4, curve 40 represents the 1.425 voltage example shown in FIG. 1, curve 42 represents the 1.375 voltage example shown in FIG. 1, and curve 44 represents the 1.325 voltage example shown in FIG. 1. The power and frequency data can be extrapolated as necessary to align the data with specific segment specifications by characterizing the power and frequency response to changes in, but not limited to, temperature and voltage.

The empirical data can come from, for example, the module final test (MFT) for the frequency and total power measurements, and the delay and steady state current measurements can be found using wafer final test (WFT). In addition, correlation equations can be calculated for any combination of variables of interest, such as frequency, power, voltage, that will likely be used within any computing device. These correlation equations can be stored, for example, in any type of database.

Thus, this correlation provides information as to how the integrated circuit devices will operate within the different environments that the integrated circuit devices will be subjected to within each of the different computing devices. Once again, this information is based on empirical test results which can comprise purely historical information, or which can be continuously updated as each new batch is produced. Armed with the knowledge of what an average processing run will likely produce and how the distribution of integration circuit devices will behave within the different operating environments, the invention can then proceed to determine the most efficient way to utilize these otherwise identical integrated circuit devices that have different operating characteristics. As explained below, the invention does this by creating sort categories or classifications into which the integrated circuit devices should be sorted, based upon the segment specifications of the different computing devices into which the integrated circuit devices could potentially be used.

More specifically, in item 204, the requirements of the computing device (e.g., power, frequency, etc.) from item 200 are then applied to the correlations from item 202 to establish cutoffs or cut points of the different sort classifications which will allow the integrated circuit devices to be sorted into groups, in item 204. In other words, if a computing device has a specified maximum allowable power, this value can be applied to the curves shown in FIG. 3 to determine the corresponding maximum allowable current that will be acceptable for that computing device. This allows the sorting process to divide the integrated circuit devices into those that are acceptable for a given computing device and into those that would not work with a given computing device. Thus, the customer specifications allow for the establishment of power and frequency cutoffs, again using previously acquired empirical data, which are used in the sorting process.

Next, in item 206, the invention establishes the sort priority based upon supply and demand for the computing devices. The predetermined order is based on customer supply and demand data for the computing devices in which the integrated circuit devices will be utilized. Thus, the invention chooses the order in which to sort the integrated circuit devices (because some integrated circuit devices will satisfy the requirements of multiple computing devices) to bias the manner in which integrated circuit devices are allocated between groups.

Then, in item 208, the invention sorts the integrated circuit devices into groups according to their performance characteristics. This sorting process 208 is performed in the predetermined order set in item 206 so that the sorting biases more integrated circuit devices into selected groups and less integrated circuit devices into other groups.

Once the integrated circuit devices are sorted, the different groups of integrated circuit devices are utilized in different computing devices (item 210) depending upon individual performance requirements of the computing devices. Step 210 involves the packaging, physical transportation, assembly, and other well-known processes involved in the manufacture of computing devices. The assembled computing devices can then be tested to establish a collection of empirical data of the integrated circuit devices operating within the computing devices. This empirical data allows for the representative distribution of the expected operating characteristics for each of the different groups of the integrated circuit devices to be prepared or revised using well-known distribution calculation techniques in item 212. Similarly, in item 214, revised supply and demand data can be utilized to reorder the priority of the sorting process established in item 206.

Figure 5:
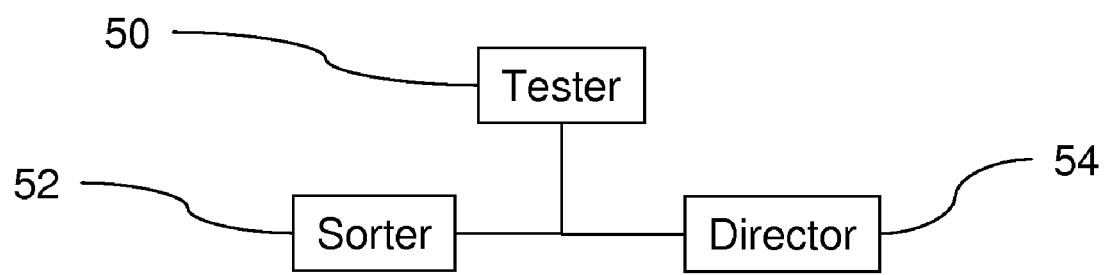
FIG. 5 is a schematic diagram of a system embodiment of the invention.

A system embodiment of the invention is shown in FIG. 5 and includes a means for evaluating performance characteristics, such as a tester 50. In addition, the system includes means for sorting, such as a sorter 52, adapted to sort the integrated circuit devices into groups according to the performance characteristics. The system also includes means for utilizing the different groups of integrated circuit devices in the form of a director 54 that is adapted to direct different groups of the integrated circuit devices in different computing devices depending upon individual performance requirements of the computing devices. The tester 50, sorter 52, and director 54 can be connected directly or indirectly using any wired or wireless network, or similar data transmission system. Within the system, the tester 50 evaluates the integrated circuit devices, for example, at different voltages and at different temperatures. Further, the tester 50 is adapted to remove defective integrated circuit devices so that only non-defective devices are included within the analysis.

Thus, the invention can utilize the integrated circuit devices in different computing devices depending upon the operating characteristic requirements of the different computing devices. This allows more of the integrated circuit devices to be utilized and also allows a single design to be utilized for many different computing devices (rather than utilizing a different design for each different computing device) which reduces the time and expense associated with creating, testing and manufacturing different designs. Further, the invention decides which cut points will be used within the sorting process depending upon the known or anticipated operating characteristic requirements of the different computing devices. Armed with the knowledge of what an average processing run will likely produce and how the distribution of integration circuit devices will behave within the different operating environments, the invention can then proceed to determine the most efficient way to utilize these otherwise identical integrated circuit devices that have different operating characteristics. As explained above, the invention does this by creating sort categories or classifications into which the integrated circuit devices should be sorted, based upon the segment specifications of the different computing devices into which the integrated circuit devices could potentially be used.

The invention also establishes a sort order priority which causes certain classifications to be filled before other classifications are filled. By determining the expected distribution of different operating characteristics of the integrated circuit devices (based on empirical test results) the invention determines which categories will be difficult to fill and which categories will be easy to fill. The sort order will first sort to supply the more difficult categories and then supply the more easily filled categories after the more difficult categories are filled. Thus, the invention more efficiently utilizes the distribution of the integrated circuit devices that are produced, which reduces waste and increases yield.

The invention allows for a rapid response to changing customer requirements in terms of decreasing the time it takes to evaluate potential supply improvements if a certain specification could be relaxed. For example, if an improved thermal solution becomes available, and thus it is possible to maintain a lower temperature inside the computing device's environment, a new supply outlook can be assessed based on this lower temperature specification. The customer can then evaluate whether this improved supply outlook is good enough to offset the possible higher cost of the improved thermal solution.

The invention allows for manufacturing and supply chain flexibility in the product segments supported at any given time in response to customers' demand. The sort reprioritization feedback loop also establishes a method for continuous improvements in decreasing waste and increasing yield.

The invention is applicable to any manufacturing industry in which the process is controlled to some distribution and the output of that process is to satisfy multiple customer requirements. These different requirements can be unique application specifications within one customer contract or unique products to multiple customers. The benefit to the applicable industries/environments is an increased productivity and optimized yield utilization.

While the invention has been described in terms of preferred embodiments, those skilled in the art will recognize that the invention can be practiced with modification within the spirit and scope of the appended claims.

What is claimed is:

1. A method of sorting and using manufactured devices, said method comprising:
    removing defective integrated circuit devices from a group of manufactured integrated circuit devices to leave non-defective integrated circuit devices;
    evaluating performance characteristics of said non-defective integrated circuit devices, wherein all of said non-defective integrated circuit devices are manufactured using an identical design, and wherein differences in said evaluated performance characteristics among said non-defective integrated circuit devices occur because of processing variations including manufacturing line variations;
    sorting said non-defective integrated circuit devices into different groups according to said evaluated performance characteristics and previously established sorting cutoffs, said previously established sorting cutoffs being based on customer specifications and on previously established correlations between different performance characteristics and different operating environments; and
    utilizing said different groups of said non-defective integrated circuit devices in different types of computing devices, said different types of computing devices comprising at least two of a personal computer, a mainframe computer, a portable digital assistance (PDA), a cell phone, an automobile, an appliance, a calculator, and a video game console, and further in different versions of each of said different types of computing devices depending upon individual operating requirements of each of said different versions of said different types of computing devices, as established by customer specifications.

2. The method according to claim 1, wherein said previously established sorting cutoffs are based on previously acquired empirical data correlating said different performance characteristics of an initial test group of said integrated circuit devices in said different operating environments, said different operating environments comprising different voltages and different temperatures.

3. The method according to claim 1, wherein said different types computing devices are based on different designs having different power and frequency requirements.

4. The method according to claim 1, wherein said different types of computing devices supply different voltages to said non-defective integrated circuit devices and require said non-defective integrated circuit devices to operate in different temperature environments.

5. The method according to claim 1, wherein at least some of said non-defective integrated circuit devices are simultaneously manufactured on the same wafer.

6. The method according to claim 1, wherein said evaluated performance characteristics comprise operating frequency, power consumption, supply voltage, voltage tolerance, and operating temperature.

7. A method of sorting and using manufactured devices, said method comprising:
    determining customer specifications for different versions of at least one computing device, said customer specifications comprising performance requirements for an integrated circuit device to be incorporated into each of said different versions;
    manufacturing integrated circuit devices according to an identical design;
    performing empirical testing on an initial group of said integrated circuit devices to determine an initial representative distribution of different performance characteristics that can be expected from an average production run of said integrated circuit devices, said empirical testing comprising testing said initial group in different operating environments to establish correlations between said different performance characteristics and said different operating environments;
    based on said customer specifications and on said correlations, establishing sorting cutoffs for sorting said integrated circuit devices into different groups;

removing defective integrated circuit devices from said integrated circuit devices to leave non-defective integrated circuit devices;

evaluating performance characteristics of said non-defective integrated circuit devices;

sorting said non-defective integrated circuit devices into said different groups according to said evaluated performance characteristics and said sorting cutoffs; and utilizing said different groups of said non-defective integrated circuit devices in said different computing devices and in said different versions depending upon said customer specifications.

8. The method according to claim 7, wherein said different versions supply different voltages to said integrated circuit devices and operate at different temperatures, and wherein said testing of said initial group of said integrated circuit devices in said different operating environments comprises testing said initial group of said integrated circuit devices at said different voltages and said different temperatures.

9. The method according to claim 7, further comprising presenting said evaluated performance characteristics as a graph, said graph representing one of power versus current and frequency versus delay.

10. The method according to claim 7, further comprising:
testing said different computing devices; and
based on said testing of said different computing devices establishing a representative distribution of expected operating characteristics for each of said different groups of said integrated circuit devices.

11. The method according to claim 7, wherein at least some of said non-defective integrated circuit devices are simultaneously manufactured on the same wafer.

12. The method according to claim 7, said operating requirements for said different versions of said different computing devices comprising both different operating frequency values and different power consumption values.

13. A system of sorting and using manufactured devices, said system comprising:
a tester adapted to evaluate performance characteristics of manufactured integrated circuit devices and remove defective integrated circuit devices to leave non-defective integrated circuit devices, wherein all of said non-defective integrated circuit devices are manufactured using an identical design, and wherein differences in said performance characteristics among said non-defective integrated circuit devices occurs because of processing variations including manufacturing line variations;
a sorter adapted to sort said non-defective integrated circuit devices into different groups according to said evaluated performance characteristics and previously established sorting cutoffs, said previously established sorting cutoffs being based on customer specifications and on previously established correlations between different performance characteristics and different operating environments; and
a director adapted to direct said different groups of said non-defective integrated circuit devices to be used in manufacturing different types of computing devices, said different types of computing devices comprising at least two of a personal computer, a mainframe computer, a portable digital assistance (PDA), a cell phone, an automobile, an appliance, a calculator, and a video game console, and further in different versions of each of said different types of computing devices depending upon individual operating requirements of each of said different versions of said different types of computing devices, as established by customer specifications.

14. The system according to claim 13, wherein said previously established sorting cutoffs are based on previously acquired empirical data correlating said different performance characteristics of an initial test group of said integrated circuit devices in said different operating environments, said different operating environments comprising different voltages and different temperatures.

15. The system according to claim 13, wherein said different types of computing devices are based on different designs having different power and frequency requirements.

16. The system according to claim 13, wherein said different types of computing devices supply different voltages to said non-defective integrated circuit devices and require said non-defective integrated circuit devices to operate in different temperature environments.

17. The system according to claim 13, wherein at least some of said non-defective integrated circuit devices are simultaneously manufactured on the same wafer.

18. The system according to claim 13, wherein said evaluated performance characteristics comprise operating frequency, power consumption, supply voltage, voltage tolerance, and operating temperature.

19. A system for sorting and using manufactured devices, said system comprising:
means for removing defective integrated circuit devices from a group of manufactured integrated circuit devices to leave non-defective integrated circuit devices;
means for evaluating performance characteristics of said non-defective integrated circuit devices, wherein all of said non-defective integrated circuit devices are manufactured using an identical design, and wherein differences in said performance characteristics among said non-defective integrated circuit devices occurs because of processing variations including manufacturing line variations;
means for sorting said non-defective integrated circuit devices into different groups according to said evaluated performance characteristics and previously established sorting cutoffs, said previously established sorting cutoffs being based on customer specifications and on previously established correlations between different performance characteristics and different operating environments; and
means for utilizing said different groups of said non-defective integrated circuit devices in different types of computing devices, said different types of computing devices comprising any two of a personal computer, a mainframe computer, a portable digital assistant (PDA), a cell phone, a video game system, and a calculator, and further in different versions of each of said different types of computing devices depending upon individual operating requirements of said different versions of said different types of computing devices, as established by customer specifications.

20. The method according to claim 19, wherein said previously established sorting cutoffs are based on previously acquired empirical data correlating said different performance characteristics of an initial test group of said integrated circuit devices in said different operating environments, said different operating environments comprising different voltages and different temperatures.

* * * * *